US012778102B2

(12) United States Patent
Alvarado Bernal

(10) Patent No.: US 12,778,102 B2
(45) Date of Patent: Nov. 3, 2026

(54) FIXED SEPARATION WING-TYPE TRAP

(71) Applicant: Ricardo Alvarado Bernal, Mexico City (MX)

(72) Inventor: Ricardo Alvarado Bernal, Mexico City (MX)

( * ) Notice: Subject to any disclaimer, the term of this patent is extended or adjusted under 35 U.S.C. 154(b) by 0 days.

(21) Appl. No.: 18/943,528

(22) Filed: Nov. 11, 2024

(65) Prior Publication Data

US 2026/0047564 A1 Feb. 19, 2026

(30) Foreign Application Priority Data

Aug. 19, 2024 (MX) .................... MX/a/2024/010159

(51) Int. Cl.
*A01M 1/02* (2006.01)
*A01M 1/10* (2006.01)

(52) U.S. Cl.
CPC .............. *A01M 1/02* (2013.01); *A01M 1/106* (2013.01)

(58) Field of Classification Search
CPC .......... A01M 1/02; A01M 1/106; A01M 1/10; A01M 1/14
USPC ............................................................ 43/107
See application file for complete search history.

(56) References Cited

U.S. PATENT DOCUMENTS 502,056 A * 7/1893 Teate .................... A01M 1/106 43/89
1,112,064 A * 9/1914 Gordon ................... A01M 1/14 D22/122
1,715,173 A * 5/1929 Opitz ...................... A01M 1/02 43/131
3,755,958 A * 9/1973 Bradshaw ............. A01M 1/145 43/114
4,044,495 A * 8/1977 Nishimura .............. A01M 1/14 43/121
4,866,877 A * 9/1989 Barak ................... A01M 1/026 43/132.1
5,042,194 A * 8/1991 Cohen .................. A01M 1/2011 43/107
5,303,501 A * 4/1994 Seemann .............. A01M 1/026 434/428
5,396,729 A * 3/1995 Vejvoda ................ A01M 1/026 43/114
5,477,636 A * 12/1995 Musket ................... A01M 1/14 43/114
6,516,558 B1 * 2/2003 Lingren .................. A01M 1/14 43/107

(Continued)

FOREIGN PATENT DOCUMENTS

JP 2006311802 A 11/2006
KR 20160001186 A 1/2016

*Primary Examiner* — Maria E Graber
(74) *Attorney, Agent, or Firm* — Nixon & Vanderhye PC

(57) ABSTRACT

The technology relates to a fixed separation wing-type trap, which improves the efficiency of wing-type traps. This trap has characteristics that enhance the efficiency and performance of such traps by maintaining a constant wing opening. This function is achieved through the existing pattern on the wings and the placement of a separator that fits precisely into the pattern's perforations, ensuring a constant separation. Additionally, the upper cover and the base can be disassembled without needing to dismantle the entire trap when replacing the base or installing different attractants.

7 Claims, 9 Drawing Sheets

(56) References Cited

U.S. PATENT DOCUMENTS

| | | | | |
|---|---|---|---|---|
| 8,079,175 | B2 * | 12/2011 | Calkins | A01M 1/145<br>43/115 |
| 8,240,081 | B2 * | 8/2012 | Cuellar Bernal | A01M 1/026<br>43/107 |
| 8,276,314 | B2 * | 10/2012 | Duehl | A01M 1/04<br>43/107 |
| 8,793,927 | B2 * | 8/2014 | Winkler | A01M 1/02<br>43/107 |
| 9,089,121 | B2 * | 7/2015 | Diclaro, II | A01M 1/20 |
| 10,375,948 | B2 * | 8/2019 | Hwang | A01M 1/2011 |
| 12,396,449 | B1 * | 8/2025 | Lingren | A01M 1/026 |
| 2002/0104255 | A1 * | 8/2002 | Hobson | A01M 1/14<br>43/114 |
| 2006/0021275 | A1 * | 2/2006 | Howse | A01M 1/023<br>43/107 |
| 2007/0094915 | A1 * | 5/2007 | Plato | A01M 1/14<br>43/107 |
| 2008/0086932 | A1 * | 4/2008 | Cook | A01M 1/02<br>43/107 |
| 2010/0242339 | A1 * | 9/2010 | Cuellar Bernal | A01M 1/145<br>43/107 |
| 2012/0285076 | A1 * | 11/2012 | Banfield | A01M 1/14<br>43/132.1 |
| 2020/0037595 | A1 * | 2/2020 | Cook | A01M 1/2005 |

* cited by examiner

FIXED SEPARATION WING-TYPE TRAP

CROSS-REFERENCE TO RELATED APPLICATION

This application claims priority to Mexican Application No. MX/a/2024/010159 filed Aug. 19, 2024, the entire contents of each of which are hereby incorporated by reference.

BACKGROUND OF THE INVENTION

1. Field of the Invention

This invention relates to the monitoring and control of pests, more specifically to an insect trap, and even more particularly to a fixed separation wing-type trap.

2. General Background of the Invention

In the current era, the generation of agricultural food is necessary in greater quantities to supply a growing population. For this reason, production models have been designed to make agricultural production more efficient, prompting the direct participants in the generation of agricultural food to develop the necessary means to achieve such feats. In this context, the present invention is involved in insect control and the improvement of fruit, vegetable, and crop production.

Throughout history, methods for controlling insects or pests have been developed to prevent the damage caused by them when agricultural products are grown or stored. In crops such as fruit trees or vegetables, pest and insect control methods have been developed through the spraying of chemicals, which reduce serious problems such as loss of agricultural production. However, these control methods generate environmental pollution and pesticide poisoning, in addition to having high costs. In this context, a method of pest and insect control using traps for their monitoring and control, without causing collateral damage, is desirable.

Considering a viable control method involves having means to capture insects or pests for their monitoring and control, various types of traps have been devised to carry out this task. One such trap is the conventional tunnel-type trap, which is formed by a triangle in which pests are captured by applying an adhesive plate only to the lower part. It is designed to capture pests only when they touch or fall to the ground. If they touch the upper part and flap their wings without falling, there is a problem that they could fly away without being captured, although this trap is still considered a control method for pests or insects in use.

Insect traps developed today, including the present invention, focus on lepidopterans (order Lepidoptera), the third most diverse group of insects, surpassed only by Coleoptera (beetles) and Diptera (flies and mosquitoes), with almost 158,000 described species. It corresponds to the largest lineage of herbivorous animals in existence. To increase the effectiveness of such traps for control and monitoring, a bait is placed on the lower wall of the trap. The bait can be solid or liquid in nature, composed of food attractive to insects, or even a pheromone to which the insects we are trying to catch and monitor are sensitive. Additionally, for this task, it is necessary to provide specific means for retaining the bait, which a priori complicates the structure and assembly of the trap. The present invention proposes designing an insect trap with greater efficiency for capturing insects for control and monitoring, in addition to being economical to manufacture and capable of withstanding the elements, while maintaining its assembly and disassembly characteristics reliably.

The present invention was created to solve the aforementioned problems, and its purpose is to control and monitor pests or insects without causing problems such as environmental pollution and pesticide poisoning. The traps can be used in greenhouses, homes, livestock sheds, orchards, forests, and areas where there is a need for pest and insect control and monitoring without causing problems like environmental pollution and pesticide poisoning. The purpose of the trap in our invention is to provide a trap to capture and monitor pests and insects with an improved structure that can easily determine the population and number of insects and pests we are dealing with for control. In this invention, the inner surface of the paper is marked with a grid-like scale to distinguish the types of pests by their size, and the scale is a unit of area divided horizontally and vertically over the entire area to easily check the number of pests collected. The total number of individuals captured can be calculated by multiplying the number of individuals formed and captured in a unit area by the total number of unit regions.

Some inventions show different types of traps, as in the case of Patent Application JP 2006311802 A1 by Yosuke Watanabe, dated Nov. 16, 2006, titled "Tool for Capturing Insects." In this invention, a triangular trap and a cylindrical trap for pest control are shown. In these configurations, a single pattern is used, and by means of folds and cuts made in the same, the geometric figure of a prismatic or cylindrical trap is obtained. However, in these traps, the pattern determines the openings that the traps will have, and these openings cannot be modified, remaining constant according to the pattern made. This limitation prevents covering different attraction areas depending on the opening that could be available in the trap for attracting the pests.

Another example of such a wing-type trap can be seen in Utility Model KR 20160001186 U1, by Cho Young Sik, et al., dated Apr. 1, 2016, titled "Trap for Monitoring Scale Insects." In this invention, there is a trap with two wings, where one wing contains the attractant and is placed on top of a second wing located below the first. However, there is no element between the two wings to maintain a constant distance, as the lower wing is placed on a flat surface, and the upper wing is suspended. This allows the two parts to be separated, with the distance between them determined by the suspended part. However, this does not prevent the hanging part from being affected by movements that cause it to become misaligned with the lower wing, which means that this wing-type trap experiences movement during positioning and does not allow for precise distances during use.

An invention that seeks to control the opening of the trap through mechanisms is found in Patent Application US 2007/0094915 A1 by Plato et al., dated May 3, 2007, titled "Insect Trap for Capturing Numerous Species of the Order Lepidoptera and Method of Operating the Same." In this trap, a separator can be seen between the main parts of the insect trap, which, by means of supports, performs the function of separating these parts. However, to perform this function, supports and a post are required, where one support holds the trap cover firmly, and the other support holds the base of the trap. Both supports are placed on a post, and the distance between these supports determines the opening area of the trap, as shown in the patent application. A disadvantage of this invention is that it presents too many components in the insect trap to achieve the objective of supporting and controlling the trap's opening area, making it difficult to position all the elements for its operation in hard-to-reach places, such as at a certain height in a tree.

From the previously mentioned and existing background, no fixed separation wing-type trap has been found with the characteristics we propose, thus realizing that there is a need for a fixed separation wing-type trap, which is why the present invention was developed and will be detailed below.

SUMMARY OF THE INVENTION

The present invention relates to a fixed separation wing-type trap, which improves the efficiency of wing-type traps. This trap has characteristics that enhance the efficiency and performance of such traps by maintaining a constant wing opening. This function is achieved through the pattern on the wings and the placement of a separator that fits into the perforations of the pattern, ensuring a consistent separation.

With our fixed separation wing-type trap, the upper part (cover) is securely attached to the lower part (base) by means of a separator. The constant opening is determined by the latches on the separator, which set the distance between the two parts.

In this way, the upper cover and the lower base can be disassembled without needing to dismantle the entire trap when replacing the base or installing different attractants.

The fixed separation wing-type trap allows for control over a specific separation required for capturing moths and insect pests that are monitored and trapped in this type of trap.

In the fixed separation wing-type trap, it is important to maintain a fixed separation between the cover and the base of the trap to allow for the proper placement of attractants and ensure that the airflow entering the trap disperses the active ingredients throughout the designated area.

A key feature of the present fixed separation wing-type trap is that the constant separation between the cover and the base allows insects to enter based on their size and flight behavior, thus making it effective for specific insect populations.

The fixed separation wing-type trap can be transported flat or assembled with the separator so that only the base needs to be attached when setting up the trap, allowing for quick and easy installation.

Another objective of the fixed separation wing-type trap is to have all the elements that improve the trap, such as perforations and markings, pre-made on the cover and base pattern.

Another objective of the present invention is to have a separator equipped with a gripping latch and a separating latch, allowing the base to be replaced without dismantling the entire wing-type trap.

Yet another objective of the fixed separation wing-type trap is to provide rigidity to the trap by means of a separator that maintains a constant distance and keeps both the cover and the base fixed in place.

An additional objective of the fixed separation wing-type trap is that it is made from high-strength recyclable materials, allowing for recycling at the end of the trap's lifecycle.

It should also be noted that the fixed separation wing-type trap is only compatible with separators that fit the insertion measurements of the separator's gripping perforations.

Therefore, the object of the present invention is to provide a fixed separation wing-type trap that aids in the monitoring and control of insects effectively, with efficient opening control mechanisms during installation.

BRIEF DESCRIPTION OF THE DRAWINGS

To complement the description being made and to assist in a better understanding of the characteristics of the invention, the present description is accompanied, as an integral part, by the drawings in which the following is illustrated in a non-limiting manner.

DETAILED DESCRIPTION OF THE INVENTION

A detailed description of the present invention is provided below, with reference to the figures.

Figure 7:
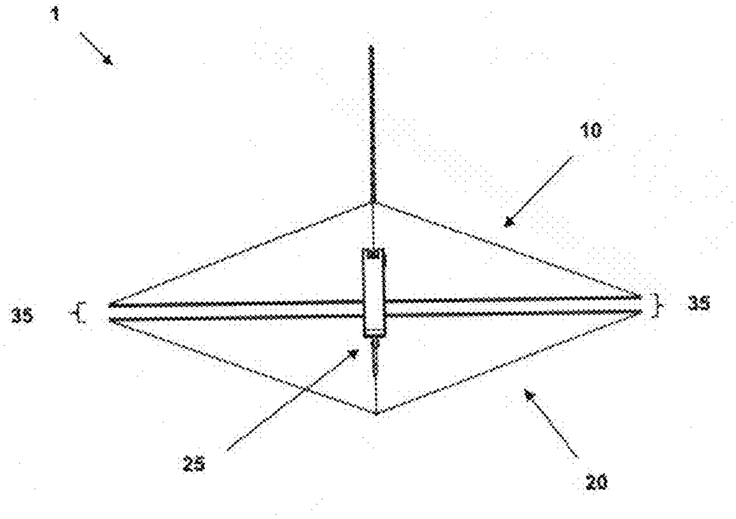
FIG. 7. Shows a front view of the cover and base of the fixed separation wing-type trap with separator and hook.

According to the present invention, the fixed separation wing-type trap (1) mainly consists of a top cover (10), a bottom cover or base (20), a separator (30), and a support wire (40). Together, these parts make up the fixed separation wing-type trap (1), as shown in FIG. 7.

Figure 1:
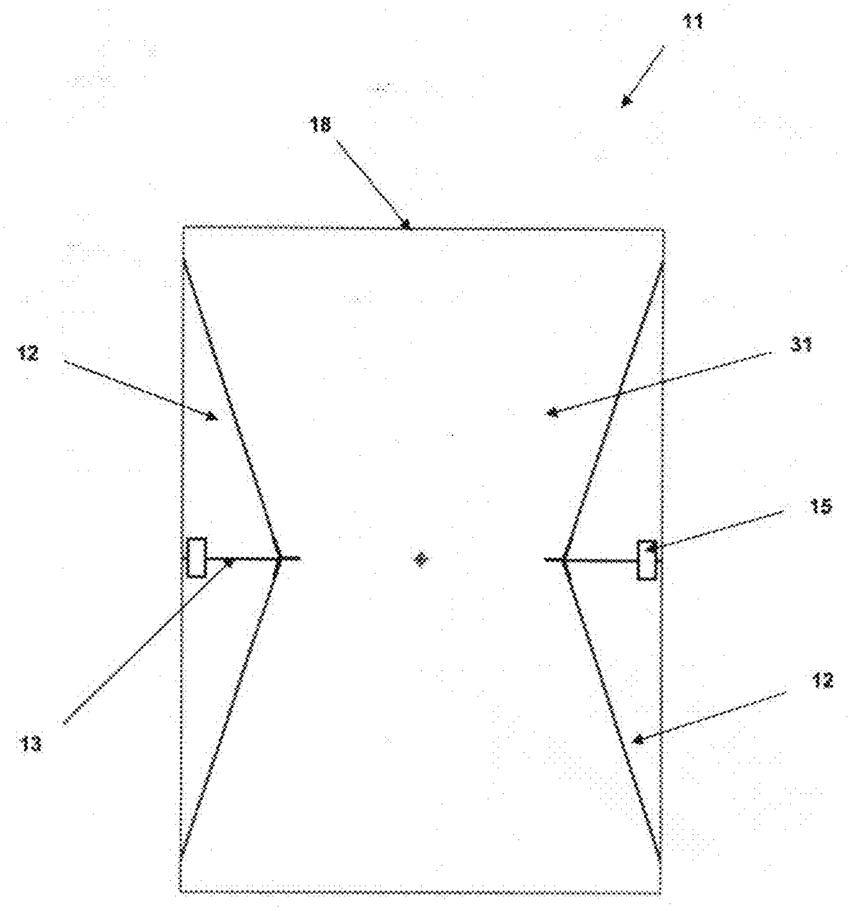
FIG. 1. Shows a top-front view of the cover of the fixed separation wing-type trap.

In FIG. 1, the top cover (10) is formed from a top cover pattern (11) of the fixed separation wing-type trap. Typically, such patterns are made from waterproof materials, such as plastic or coated cardboard, allowing for water resistance. Bioplastics can also be used, as long as they are recyclable. In this case, the top cover pattern (1) is made of a rigid plastic material that can be folded without breaking during manipulation. Additionally, the material does not emit odors that might confuse the insects when the trap is in use. For this invention, a polypropylene pattern has been considered, which is easy to handle and environmentally friendly. The top cover pattern (1) is a rectangular piece with a specific thickness that allows it to be folded without breaking, offering a high degree of manipulation and extending its useful life.

The top cover pattern (1) of the fixed wing-type trap (10) is formed from a rectangular geometric shape with a thickness that allows for folding. Its long sides feature diagonal folds (12), enabling the lateral folding of the pattern (11). A central fold (13) is also present in this lateral part. Together with the two diagonal folds (12), this central fold (13) allows the lateral folding of the pattern (1) to form a concave shape, creating part of the top cover (10). These diagonal folds (11) are made from a marked diagonal line on the pattern (1), starting from the middle of the pattern at an intersection with the central fold line (13), where a Y-shaped cut (16) is located on the pattern (11). The diagonals end near one end of the long side of the pattern (11), forming two right triangles on one lateral side of the pattern (11). This same feature is present on both lateral ends of the pattern (1), and when folded along these lines, the top cover (11) of the fixed separation wing-type trap is formed.

A rectangular perforation (15) for the separator grip is located on the central fold (13), near the lateral edge (2). This configuration is repeated symmetrically on the opposite end of the pattern (1), specifically on the opposite lateral edge (2). This ensures that when both sides are folded, the top cover (10) of the fixed separation wing-type trap is fully formed.

Figure 3:
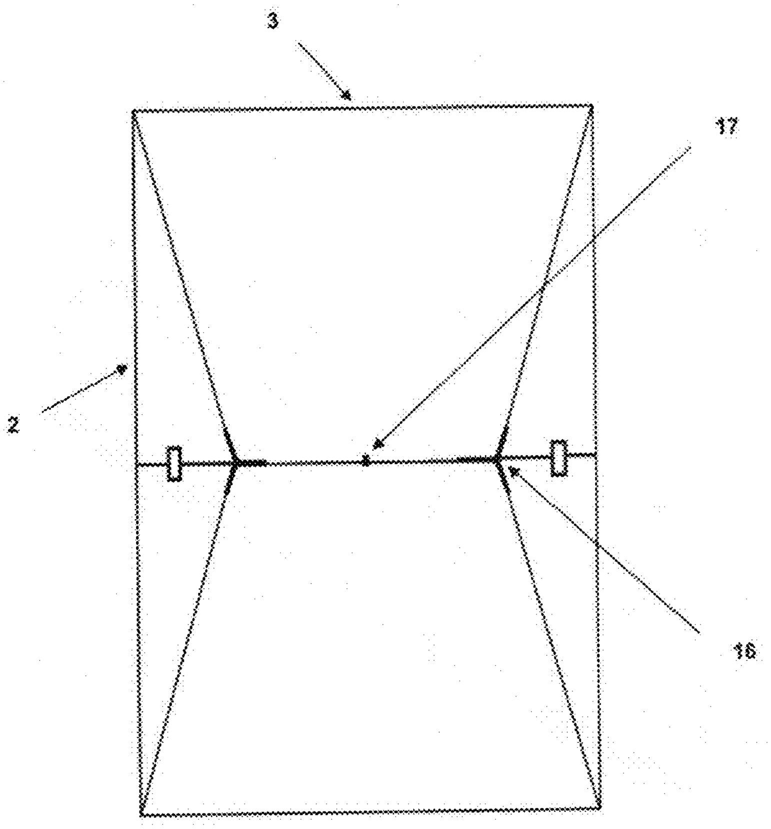
FIG. 3. Shows a bottom view of the top cover of the fixed separation wing-type trap.
Figure 4:
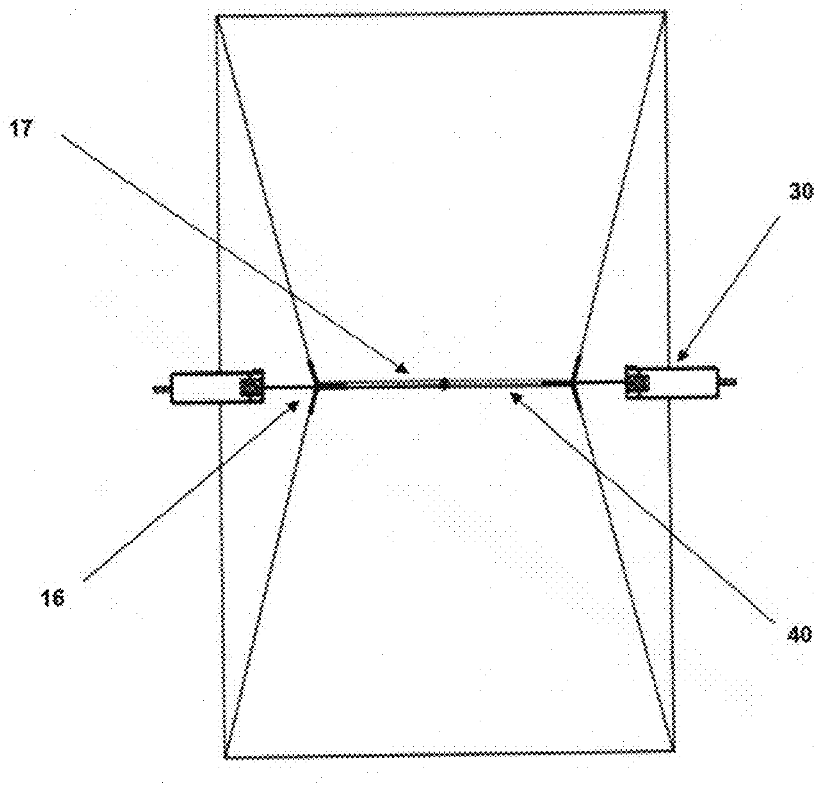
FIG. 4. Shows a top-front view of the cover of the fixed separation wing-type trap with separators.
Figure 5:
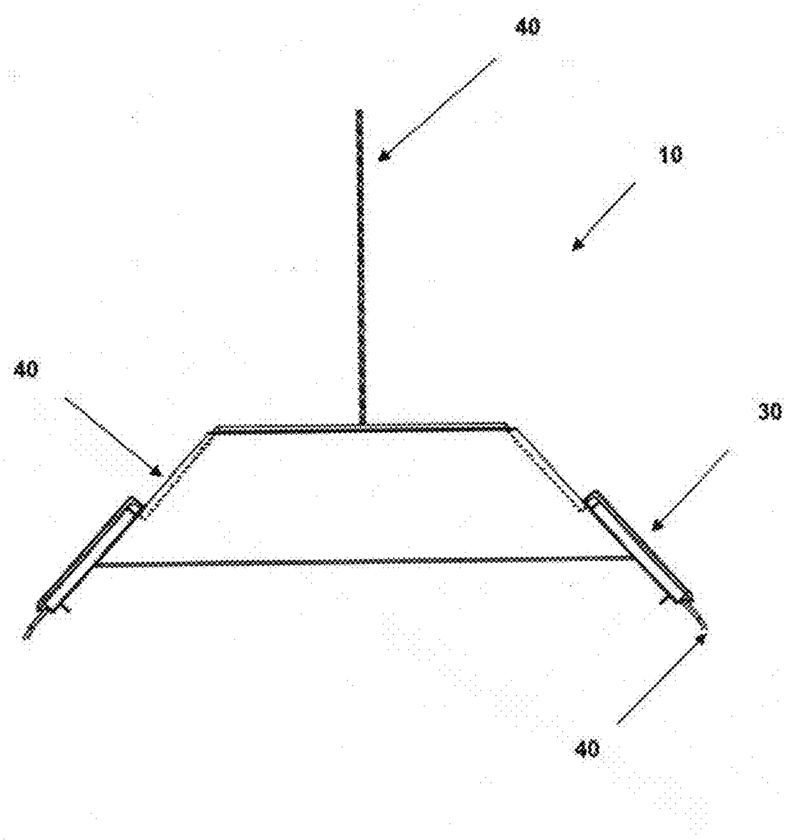
FIG. 5. Shows a side view of the main cover of the fixed separation wing-type trap with separators and hook.
Figure 8:
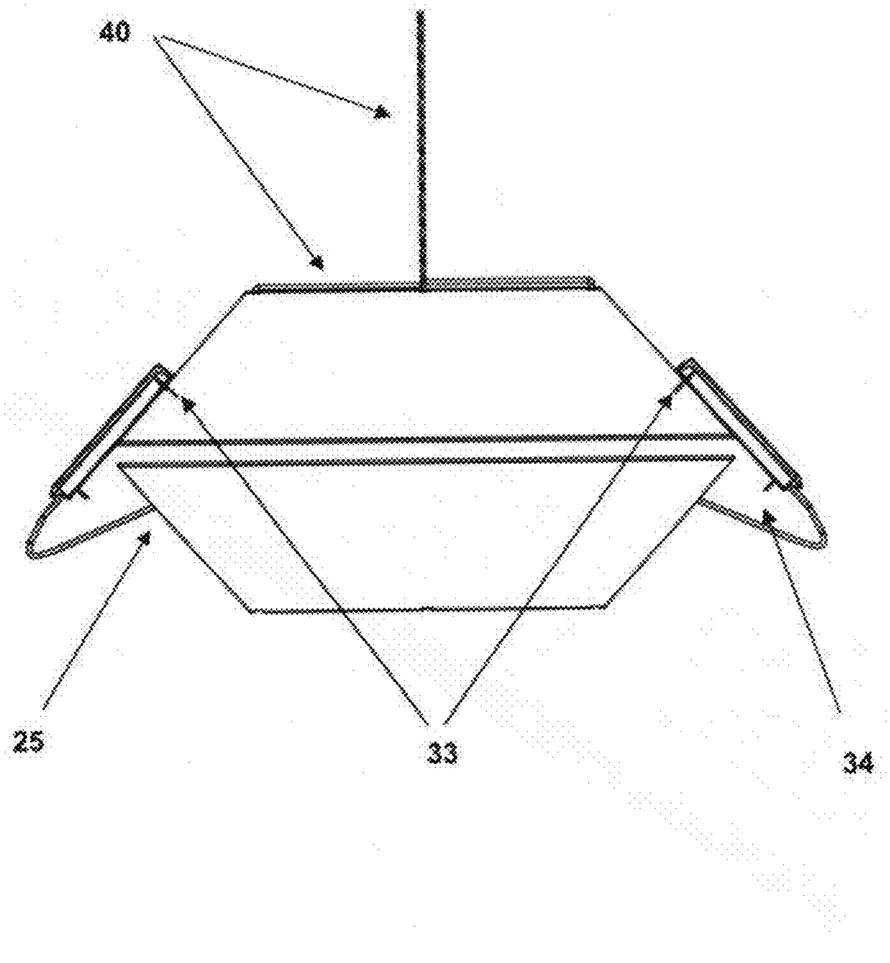
FIG. 8. Shows a front side view of the cover and base of the fixed separation wing-type trap with separator and hook.

Pattern 1 features two opposite central Y-shaped cuts, as well as a central perforation (17), as shown in FIGS. 3 and 4. This perforation allows the insertion of the insect attractant holder. As the name suggests, this central perforation is located in the middle of the pattern, both lengthwise and widthwise, as it is preferred to place the attractant device in this central perforation (17). This location provides the best balance point to hold the attractant device and disperse its scent. A Y-shaped cut (16) is positioned along the central line of the wide part, near the intersection of the diagonal folds (12). This is also mirrored on the opposite end of the pattern (11). The Y-shaped cuts (16) allow a supporting element to pass through the wing-type trap (1). An essential feature of the rectangular gripping perforation (15) is that it has a rectangular section that matches the latch (33), as seen in FIGS. 4, 5, and 8. This perforation (15) is crucial to achieving optimal and constant separation between the cover (10) and the base (20) of the fixed separation wing-type trap when both parts are assembled.

Figure 2:
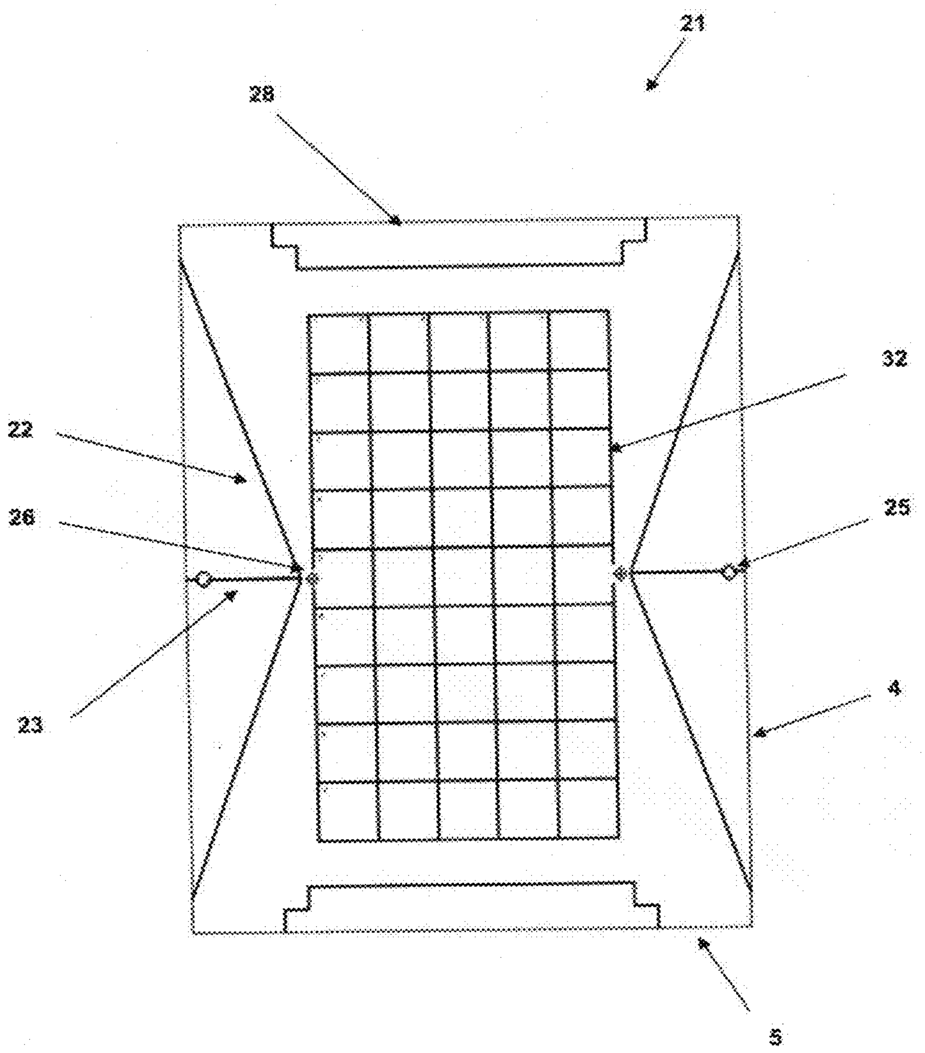
FIG. 2. Shows a bottom-front view of the base of the fixed separation wing-type trap.

In FIG. 2, the lower cover or base (20) is formed from a lower cover pattern (21) of the wing-type trap. As previously described, these patterns are typically made from waterproof materials, such as plastics or coated cardboard, that allow for such a property, or bioplastics, which are recyclable materials. In this case, the base pattern (21) is made from rigid plastic, which allows for folds without breaking or tearing during manipulation. Additionally, the material does not emit odors that could repel or confuse the insect. In this context, polypropylene has been considered for the current invention because it is easy to handle and environmentally friendly. Thus, the base pattern (21) is a rectangular piece with a specific thickness that allows it to be folded without breaking, increasing the handling capability and extending the lifespan of the pattern (21).

The base pattern (21) of the wing-type trap's lower cover (20) is formed from a rectangular geometric shape with a thickness that allows folding. Its long sides feature diagonal folds (22), which enable the lateral folding of the pattern (21). A central fold (23) is also present in this lateral part. Together with the two diagonal folds (22), the central fold (23) allows the lateral folding of the pattern (21), forming a concavity that shapes part of the base (20). These diagonal folds (22) begin from the marked diagonal line on the pattern (21), starting from the middle of the pattern (21) at the intersection with the central line (23) without reaching the point where the fastener passage guide (26) of the pattern (21) is located. The diagonals end near the edge of the long side of the pattern (21), forming two right triangles on one lateral part of the pattern (21). This same configuration is present on both lateral ends of the pattern (21). When folded along these lines, the lower cover (21) is fully formed. In this pattern (21), there is a gripping perforation (25) for the separator, located on the central fold (23) near the lateral edge (4). This configuration is repeated symmetrically on the opposite end of the pattern (21), specifically on the opposite lateral edge (4). The marking and folding are symmetrical on both sides, ensuring that when both sides are folded, the lower cover (20) of the fixed separation wing-type trap is completely formed.

Pattern 21 features at least two circular perforations. Along the central line of the wide part, there is a perforation (25) (see FIGS. 7 and 8) near the intersection of the diagonal folds (22). This is mirrored on the opposite end of pattern 21. These perforations (25) allow a supporting element to pass through and hold the wing-type trap (1).

Pattern 21 also has two ventilation openings (28) or insect entryways located on the short edge (5) of pattern 21. These ventilation openings (28) are formed by making a stepped cut from one end of the short edge (5) toward the central part of the pattern, and on the opposite end of the same short edge (5), another stepped cut is made. Both ends are marked at the final step of the pattern (21), which serves to fold the ventilation opening (28) when the lower cover (20) is in position for use.

Additionally, pattern 21 may feature a grid chart (32) on the inner part, where statistical and control annotations can be made, allowing the identification of each wing-type trap along with its control values.

In FIG. 3, the top cover (10) of the wing-type trap is shown, indicating the lateral edge (2), which is symmetrical in the pattern, as well as the short edge (3), which is also symmetrical. The Y-shaped cuts (16) are visible, along with the central perforation (17) in a folded form, with pattern (1) thus forming the top cover. It is important to note that the Y-shaped cuts (16) will only allow the passage of the support wire (40), without allowing water or any other substance that could contaminate the attractant of the wing-type trap (1) to pass through.

Figure 6:
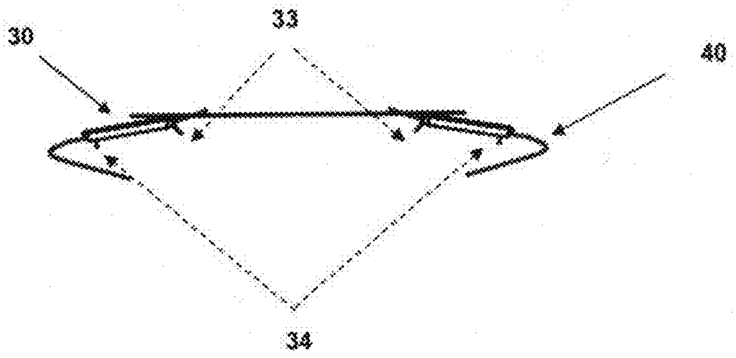
FIG. 6. Shows a cross-sectional view along the x-axis of the main front view of the cover of the fixed separation wing-type trap with separators.

In FIGS. 4 and 5, the separator (30) is shown on each lateral side of the top cover (10). This separator has a gripping latch (33) and a separating latch (34), as seen in FIG. 6. These allow the connection between the top cover (10) and the base (20), forming the wing separation (34) (see FIG. 7). This separation is a fundamental part of the present invention, as it allows for more efficient control and proper monitoring of the insects to be sampled. Additionally, the separator (30), equipped with the gripping latch (33) and the separating latch (34), allows for the base (21) to be replaced without dismantling the entire wing trap. The top cover (10) and base (20) can be disassembled without needing to take apart the trap when replacing the base or installing different attractants.

Figure 9:
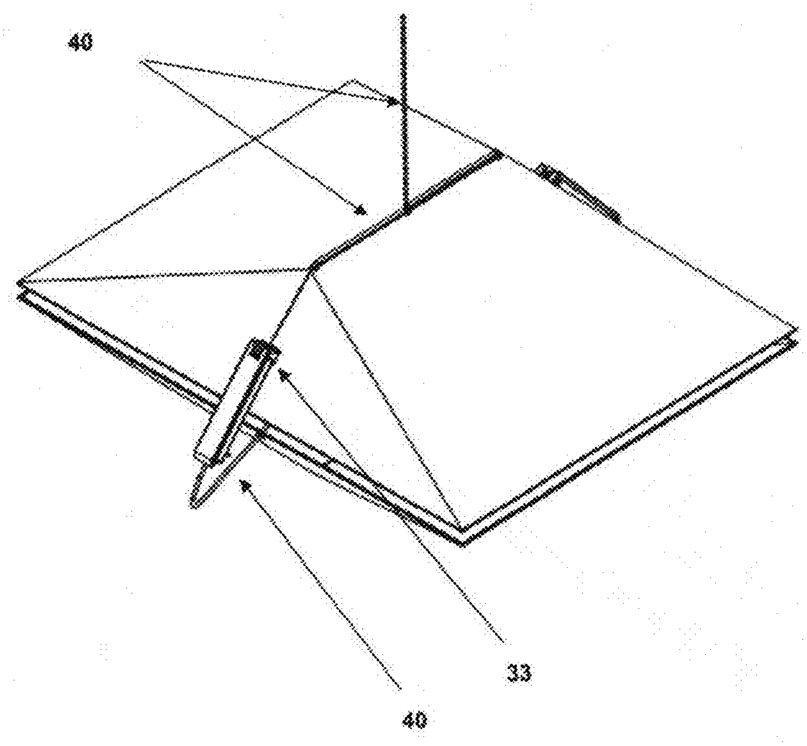
FIG. 9. Shows a top-front view of the cover and base of the fixed separation wing-type trap with separator and hook.

In FIGS. 8 and 9, the gripping latches (33) are inserted into the top cover, specifically into the perforation (16). In the base (20), it is shown how the support wire (40) is inserted, and once inserted, the separating latch (34) functions to determine the wing separation (35). This separation is determined by the type of separator used to establish the distance between the wings (10 and 20), ensuring the optimal separation for adequate sampling and monitoring of the insect.

Figure 10:
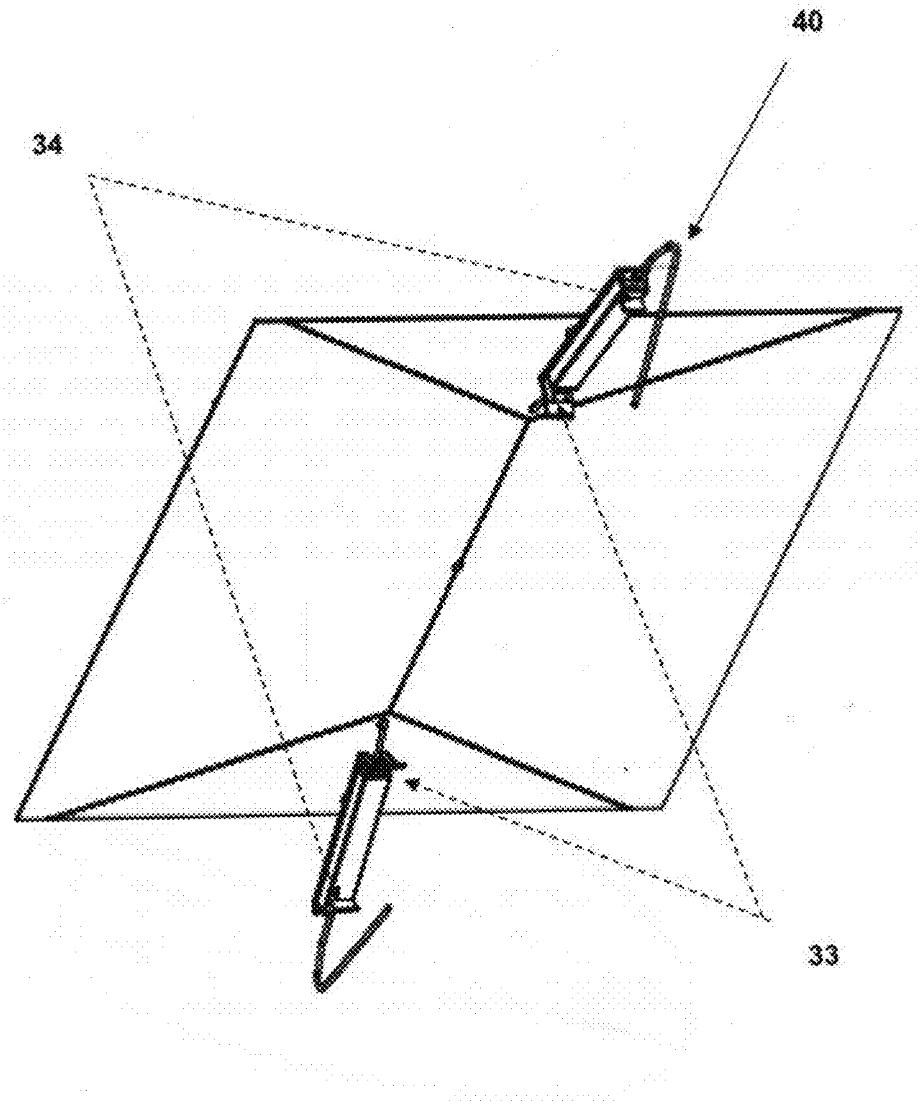
FIG. 10. Shows a bottom view of the cover of the fixed separation wing-type trap with separator and hook.

In FIG. 10, the separator (30) is shown positioned on the cover (10), which has already been inserted. The gripping latch is visible inside the cover (10), and the lower part of the separator (30) is still free, with the separating latch not yet placed in the base (20) to determine the fixed distance established by the separator (30).

To better illustrate the invention, here is a list of parts that make up the fixed separation wing-type trap:

1 Fixed separation wing-type trap with separators
2 Lateral edge of the cover pattern
3 Short edge of the cover pattern
4 Lateral edge of the base pattern
5 Short edge of the base pattern
10 Upper cover of the wing-type trap
11 Upper cover pattern of the wing-type trap

12 Diagonal folds for lateral folding 12
13 Central fold
15 Rectangular perforations for separator grip
16 Y-shaped cut
17 Central perforation for attractant holder insertion
20 Lower cover or base of the wing-type trap
21 Base pattern of the wing-type trap
22 Diagonal folds for lateral folding
23 Central fold
25 Separator grip perforations
26 Fastener passage guide
28 Ventilation openings or insect entryways
30 Separator
32 Base grid chart
33 Gripping latch
34 Separating latch
35 Fixed wing separation
40 Support wire
41 Fixation wire Having sufficiently described my invention, I consider it to be novel and therefore claim as my exclusive property the content of the following clauses:

1. A fixed separation wing-type trap, comprising:

a. an upper cover having a rectangular geometric pattern, wherein the upper cover has two diagonals for folds on long sides of the rectangular geometric pattern that allow for the lateral folding of the rectangular geometric pattern, in a lateral part of the rectangular geometric pattern, a line central for fold exists, which, together with the two diagonals for folds, allows for the lateral folding of the rectangular geometric pattern to form a concavity that shapes part of the upper cover, the two diagonals for folds start from a diagonal line marked on the rectangular geometric pattern, beginning from the middle of the rectangular geometric pattern at a height intersecting with the central line, without reaching a point where a Y-shaped cut is located on the rectangular geometric pattern, the two diagonals for folds end near one end of the long part of the rectangular geometric pattern, forming two right triangles on one lateral part of the rectangular geometric pattern, and when folded along these lines, the upper cover is formed, and the rectangular geometric pattern also contains a rectangular perforation for gripping a separator, located on the central fold near the rectangular geometric pattern lateral edge; and b. a lower cover having the rectangular geometric pattern with a thickness that allows for folding, wherein on long sides of the lower cover, the lower cover has diagonals for folds that allow for the lateral folding of the rectangular geometric pattern, in a lateral part of the rectangular geometric pattern, a central fold exists, which, together with the two diagonals for folds, allows for the lateral folding of the rectangular geometric pattern to form a concavity that shapes part of the lower cover, the two diagonals for folds start from a diagonal line marked on the rectangular geometric pattern, beginning from the middle of the rectangular geometric pattern at a height intersecting with the central line, which without reaching where a fastener passage guide is located on the rectangular geometric pattern the two diagonals for folds end near one end lateral of the rectangular geometric pattern, forming two right triangles on one lateral part of the rectangular geometric pattern, and when folded along these lines, the lower cover is formed, and the rectangular geometric pattern includes a separator grip perforation, located on the central fold near the lateral edge, wherein the separator is positioned on each lateral side of the upper cover, which includes a gripping latch and a separating latch thereby allowing for the connection between the upper cover and the lower cover forming the separation between the upper cover and the lower cover.

2. The fixed separation wing-type trap according to claim 1, wherein the rectangular geometric pattern has three circular perforations, including a central perforation that allows the insertion of an insect attractant holder, the central perforation is positioned both lengthwise and widthwise, along a central line of a wide part, another Y-shaped cut near the intersection of the two diagonals for folds exists, and a same arrangement is mirrored on the opposite end of the rectangular geometric pattern, creating two Y-shaped cuts that allow the passage of a support element for holding the wing-type trap.

3. The fixed separation wing-type trap according to claim 1, wherein the rectangular perforation has a rectangular section that matches the gripping latch.

4. The fixed separation wing-type trap according to claim 1, wherein the rectangular geometric pattern has at least two circular perforations, arranged along the central line of the wide part, there is a perforation near the intersection of the two diagonals for folds, and the perforation allows the passage of a support element for the wing-type trap.

5. The fixed separation wing-type trap according to claim 1, wherein the rectangular geometric pattern has two ventilation openings located on a short edge of the rectangular geometric pattern, the two ventilation openings are formed by making a stepped cut from one end of the short edge toward the central part of the pattern, and on the opposite end of the same short edge, another stepped cut is made, and both ends are marked at a final step of the rectangular geometric pattern, allowing the folding of the ventilation opening.

6. The fixed separation wing-type trap according to claim 1, wherein the rectangular geometric pattern includes a grid chart on an inner part, where statistical and control annotations can be made, allowing each wing-type trap to be identified with control values.

7. The fixed separation wing-type trap according to claim 1, wherein the separator, equipped with the gripping latch and the separating latch, allows the base to be replaced without dismantling the entire wing-type trap.

* * * * *